United States Patent

Caretta et al.

(10) Patent No.: US 6,571,845 B1
(45) Date of Patent: Jun. 3, 2003

(54) LOW-SECTION TIRE AND MOULD AND PROCESS FOR MANUFACTURING A TIRE AIR TUBE

(75) Inventors: Renato Caretta, Gallarate (IT); Federico Mancosu, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/570,531

(22) Filed: May 12, 2000

Related U.S. Application Data

(63) Continuation of application No. PCT/EP98/07156, filed on Nov. 10, 1998.
(60) Provisional application No. 60/098,369, filed on Aug. 28, 1998.

(30) Foreign Application Priority Data

Nov. 14, 1997 (EP) .............................................. 97830600

(51) Int. Cl.⁷ .............................. B60C 5/22; B29D 23/24
(52) U.S. Cl. ................................. 152/339.1; 152/331.1; 152/342.1; 152/511; 152/512; 156/119; 425/28.1; 425/35; 425/47
(58) Field of Search ........................... 152/339.1, 342.1, 152/331.1, 511, 512, 453, 500, 514; 156/119, 118, 123, 130.5; 264/328.3; 425/28.1, 35, 47, 521

(56) References Cited

U.S. PATENT DOCUMENTS

| | | | |
|---|---|---|---|
| 1,345,998 A | * | 7/1920 | Carlisle ........................ 152/453 |
| 1,456,075 A | | 5/1923 | Resk |
| 2,039,343 A | | 5/1936 | Prokul |
| 2,269,244 A | | 1/1942 | Berry |
| 2,282,598 A | | 5/1942 | Austria |
| 2,324,974 A | * | 7/1943 | Greenup ........................ 156/118 |
| 2,469,300 A | * | 5/1949 | Heyneman ................. 152/339.1 |
| 2,998,044 A | * | 8/1961 | Sloneker ....................... 152/511 |

FOREIGN PATENT DOCUMENTS

| | | | |
|---|---|---|---|
| DE | 296 20 713 U1 | 4/1997 | |
| EP | 0238679 | 9/1987 | |
| EP | 0311403 | 4/1989 | |
| FR | 2114604 | 6/1972 | |
| FR | 2348066 | 11/1977 | |
| FR | 2524849 | 10/1983 | |
| FR | 2605269 | 4/1988 | |
| GB | 1572407 | 7/1980 | |
| GB | 2 104 012 | 3/1983 | |
| GB | 2118492 A * | 11/1983 | ............... 264/328.3 |
| WO | WO-94/26541 A1 * | 11/1994 | ............... 152/339.1 |

* cited by examiner

*Primary Examiner*—Geoffrey L. Knable
(74) *Attorney, Agent, or Firm*—Finnegan, Henderson, Farabow, Garrett & Dunner, L.L.P.

(57) ABSTRACT

A low-section tire includes an air tube including an internal wall and two air tube sidewalls. The internal wall comprises a greater rigidity than the tube sidewalls so that, when a carcass and the tube are mounted on a rim, and during inflation, the tube sidewalls contact the carcass sidewalls no later than the internal wall contacts a crown portion of the carcass. A process for manufacturing the air tube includes moulding two tube sidewalls separated from each other, moulding a central core, arranging the tube sidewalls and central core in a single vulcanization mould, closing the vulcanization mould to form the tube, feeding pressurized fluid into at least two distinct circumferential portions of the tube, and vulcanizing the tube to join the central core and tube sidewalls. A mould for manufacturing the an air tube includes two axially-external cheeks, two axially-intermediate male dies, and two axially-inner spacers.

51 Claims, 4 Drawing Sheets

LOW-SECTION TIRE AND MOULD AND PROCESS FOR MANUFACTURING A TIRE AIR TUBE

CROSS-REFERENCE TO RELATED APPLICATIONS

This application is a continuation of International Application No. PCT/EP98/07156, filed Nov. 10, 1998, in the European Patent Office, the contents of which are relied upon and incorporated herein by reference; additionally, Applicants claim the right of priority under 35 U.S.C. §119(a)–(d) based on patent application Ser. No. 97830600.9, filed Nov. 14, 1997, in the European Patent Office; further, Applicants claim the benefit under 35 U.S.C. §119(e) based on prior-filed, copending provisional application Ser. No. 60/098,369, filed Aug. 28, 1998, in the U.S. Patent and Trademark Office.

BACKGROUND OF THE INVENTION

1. Field of the Invention

The present invention relates to an air tube for tires, to a process and related apparatus for its manufacture, and to wheels comprising tires provided with such an air tube; more particularly, the invention relates to an air tube intended for supporting the tire even in case of deflation thereof, as a result of a puncture for example.

More specifically, even if not exclusively, the air tube of the present invention is particularly suitable for tires of an elliptical transverse section in which the size of the minor axis parallel to the equatorial plane is smaller than the size of the major axis parallel to the rotation axis, and still more particularly for the so-called "low-section tires", in which the ratio of the section height measured between the bead base and the tread band centre to the maximum tire width is equal to or lower than 0.7.

2. Description of Related Art

For better understanding the terminology used in he progress of the present specification the main features of a tire are hereinafter briefly set forth.

Generally, a tire comprises a carcass of toroidal shape having a crown portion and two axially opposite sidewalls, terminating with a pair of beads, each provided with at least one bead ring for anchoring of the tire to a corresponding mounting rim, a tread band disposed crownwise to said carcass, the carcass being provided with at least one reinforcing ply extending from the bead to bead and having its ends anchored to said bead rings.

In the case of radial tires, a belt structure, interposed between the carcass and tread band is also present, which bead structure may be comprised of two superposed layers of metallic cords disposed in crossed relationship with respect to each other and a radially outermost layer having textile cords directed parallelly to the equatorial plane of the tire.

These tires delimit an inner space between the carcass and rim which can be directly filled with air under pressure or occupied by an air tube of rubber material inflated with air under pressure.

In connection with the different solutions adopted, tires are identified as tubeless tires or tube type tires.

Many and varied solutions have already been provided for enabling tire running even in the case of partial or complete loss of air, as a result of punctures for example, over a fairly long length, at a moderate speed, to allow reaching of a service area where the necessary repairs or replacements can be carried out. These punctures mostly take place due to nails or other sharp pointed bodies spread on the ground, although these are not the only causes for possible deflation.

As regards tires provided with an air tube, the most widely proposed solutions contemplate use of an air tube divided into a plurality of circumferential or transverse compartments, independent of each other, by means of walls disposed parallel or perpendicular to the equatorial plane of the air tube itself.

The presence of several compartments independent of each other enables a sufficient inflation pressure to be maintained in the tire, thereby allowing the tire to run in an emergency condition even when one of said compartments has been punctured.

Examples of such a kind of tire are disclosed in U.S. Pat. No. 2,039,343 and GB 2 104 012, wherein one or more partition wall divide the the air-tube into two or more annular chambers. Reinforcement of each partition wall is provided for assuring suitable resistance to puncturing agents. However, suitable measures are necessarily taken for allowing the partition wall to spread itself, so as to be forced into engagement with the sidewall of the tube when the air within one chamber expand, as a consequence of deflation of the other chamber upon failure caused by a puncturing agent.

FR 2 524 849 discloses an apparatus for manufacturing an air tube of conventional type, i.e. not provided with partition walls, said apparatus comprising a pair of cheeks and a male die removably interposed therebetween. An elastomeric compound is injected into two distinct cavities defined between each cheek and the male die interposed therebetween, so as to form two parts of the air tube. The male die is then removed and the cheeks are approached one to the other to form the air tube by joining the two parts at their opposite edges.

As regards tubeless tires, the proposed solutions have directed their efforts towards modifications of the carcass structure by either strengthening the tire sidewalls to make the tire capable of self-support or, alternatively, creating independent compartments similar to those of the air tubes.

On the contrary, the solution of leaving the "tubeless" version in favour of the "tube type" version is not feasible with the so-called low-section tires, that is those having elliptical sections increasingly more elongated relative to the rotation axis, in which a great difficulty is found in employing known rubber air tubes.

Actually, traditional air tubes during inflation take a substantially circular profile in right section which badly matches with the elliptical tire profile, giving rise to folds overlapping each other that make it impossible to reach a correct and complete extension of the air tube walls over the inner surface of the toroidal cavity, in particular at the tire sidewalls, thereby generating a bad filling of the toroidal cavity and a dangerous state of inner stresses in the air tube wall, so that the air tube becomes quickly useless.

Consequently, in low-section tires, devoid of an air tube, the problem of ensuring a run under emergency conditions is now still solved by modifying the carcass structure, as previously stated.

The utility model DE 296 20 713 U1 discloses a tubeless tire comprising an inner central vertical wall disposed between the centre line of the tread band and the wheel rim on which the tire beads are mounted. The vertical wall is fitted, at the lower end thereof, into an appropriate rim seat so as to define two air spaces inside the tire, which air spaces are independent of each other, and each of which is inflated by a respective valve.

Practically the principle which informs this solution corresponds to that of having two twin tires mounted on one and the same rim.

Should one of the two carcass parts be punctured, the tire will be stabilized by the air pressure existing in the other part located at the side of the deflated one.

Patent application FR 2,605,269, in turn, discloses a tubeless tire formed of a plurality of distinct circumferential compartments, disposed axially in side by side relationship.

An appropriate inflating device comprises a tube passing through the lower part of all partitions generating the different circumferential compartments and is provided with a hole at each compartment: fitted in the tube is an axially drilled rod provided, on its side wall, with other holes which can be brought into communication with those of the tube to enable inflation of the tire by air inflated from the rod. Axial displacement of the rod relative to the tube enables the holes of the former to be made offset relative to those of the latter so as to stop air escape from the different compartments.

In conclusion, there is not yet the availability of an air tube adapted for being used with a low-section tire, which is capable of ensuring running under emergency conditions without being obliged to resort to an expensive and complicated modification of the tire carcass structure.

SUMMARY OF THE INVENTION

The Applicant has perceived the possibility of solving the problem by adopting an air tube divided into at least two distinct circumferential portions, separated from, each other by a longitudinal wall, while however assigning a greater rigidity to said wall and preferably also to the area surrounding it than the axially outermost portion thereof, that is the air tube sidewalls, in such a manner that during inflation of the air tube inside the tire the air tube expansion in an axial direction is greater than that in a radial direction, so as to bring its central portion into contact with the tread area simultaneously with the complete lying down of the tube sidewalls against the tire sidewalls, while avoiding arising of abnormal stresses within the air tube walls.

The Applicant has further perceived that such a solution could be obtained by manufacturing the air tube sidewalls separately from the central portion thereof and subsequently joining the distinct portions to each other, conveniently by chemical adhesion of the respective elastomer materials during the air tube vulcanization.

In one aspect, the invention therefore relates to an air tube of elastomer material, which air tube is divided into at least two distinct circumferential portions, separated by an internal wall extend in a plane normal to the rotation axis of said air tube, having its ends joined to a pair of axially opposite sides that, together with said wall, delimit said distinct circumferential portions, characterized in that the rigidity of said wall is greater than that of the sidewalls.

Preferably, said air tube is characterized in that it comprises a central core and two axially opposite sidewalls, the core being formed of said wall provided at its ends with two flanges extending perpendicularly to the wall itself in axially opposite directions, the ends of which are associated with the corresponding ends of said sidewalls, the core rigidity being greater than that of the sidewalls.

In the following of the present description the air tube features, the method and apparatus for manufacturing said air tube as well as use of same in matching relationship with a tire are, for convenience, always described with reference to the core, but it is intended that they also apply when the core consists of the wall alone, substantially devoid of said flanges.

In accordance with a first embodiment, the different rigidity between the core and sidewalls is obtained by resorting to one and the same elastomer material and varying the core geometry relative to the sidewall geometry, and more particularly by making the core of a greater thickness than the sidewalls.

In accordance with a second embodiment, the different rigidity is achieved by adopting different materials having the same thickness, and more particularly through the use of a material of greater modulus for the core than for the sidewalls.

In an alternative solution, the different rigidity is obtained by adopting different materials and different thicknesses; in the embodiments providing different materials, preferentially the material of the central core is reinforced with short fibres in the form of pulp, of the type obtained by grinding processes.

In a second aspect, the invention relates to a tire wheel comprising a tube-type tire mounted on the corresponding rim.

The tire comprises a carcass of toroidal shape having a crown portion and two axially opposite sidewalls, a tread band located crownwise to said carcass and a belt structure disposed crownwise between the carcass and tread band; in a preferred embodiment of said tire the sidewalls terminate with a pair of beads incorporating bead rings for anchoring of the tire to said rim and, still more preferably, the carcass is provided with at least one reinforcing ply extending from bead to bead, having its ends anchored to said rings.

The air tube is divided into at least two circumferential portions separated by a wall extending in a plane perpendicular to the rotation axis of the air tube.

The lyre wheel is characterized in that said air tube comprises a central core ad two sidewalls; preferably the core, the rigidity of which is greater than that of the sidewalls, can have said wall provided with two flanges issuing from its ends and extending at right angles thereto in opposite directions over a length of predetermined width.

In a preferential solution the flange and sidewall ends are associated with each other by vulcanization.

In a preferential embodiment of the invention the tire wheel comprises said air tube inserted into a tire having a section ratio H/C not exceeding 0.7.

Preferably, the junction area between the radially outer flange of the central core and the corresponding air tune sidewall is axially internal to the corresponding end of the tire belt structure.

In a further aspect, the air tube of the invention is used as a vulcanization bladder, thus becoming one body with the tire carcass, in such a manner that it advantageously replaces the impermeable liner of tubeless tires.

In a third aspect, the invention relates to a process for manufacturing an air tube of elastomer material, divided into at least two distinct circumferential portions separated by an interior wall extending in a plane normal to the rotation axis of said air tube, characterized in that it comprises the following steps:
   a) moulding a pair of sidewalls, separated from each other, for said air tube;
   b) moulding said wall of the air tube in an annular configuration comprising a central core from the ends of which two flanges, i.e. a radially external one and a radially internal one, issue, said flanges extending axially in opposite directions at right angles to said core, over a length of predetermined width;

c) introducing said wall and sidewalls into one and the same vulcanization mould, said sidewalls being disposed with their opposite ends coaxial with each other and mutually facing, said wall being disposed between said opposite sidewall ends at a coaxial position with the sidewalls, and the flange ends and the corresponding sidewall ends being in mutual contact;

d) feeding fluid under pressure to a preestablished temperature into the different distinct portions of said air tube;

e) vulcanizing the air tube while at the same time causing a junction between said flanges and sidewalls.

Preferentially the process is put into practice by executing said moulding operations by injection of the elastomer material into cavities suitably arranged for formation of said sidewalls and wall.

In a fourth aspect, the invention relates to a mould for manufacturing an air tube of elastomer material, divided into at least two distinct circumferential portions, separated by a wall extending in a plane normal to the rotation axis of said air tube, characterized in that it comprises the following pieces:

a pair of axially external cheeks provided, at their mutually facing surfaces, with an annular cavity coaxial with the rotation axis of the air tube being formed, of a substantially semicircular right section;

a pair of axially intermediate male dies which are provided:

at their axially outer surfaces, with a first annular ridge coaxial with said rotation axis, of semicircular right section, housed, when the mould is closed, in the corresponding annular cavity of the adjacent cheek, the radius of said annular ridge being smaller than the radius of the corresponding cavity so as to delimit, in mating relationship with said cavity, a hollow space of a width corresponding to a sidewall of said air tube, and at their axially inner surfaces, with a second annular ridge coaxial with said rotation axis, in axial alignment with said first annular ridge, having a right section of substantially quadrangular shape, the maximum radial sizes of said first and second annular ridges being substantially identical; and a pair of axially inner spacers, a radially inner disc and a racially outer concentric ring respectively, coaxial with said rotation axis, the disc having a smaller diameter than the radially inner diameter of the ring, the disc diameter and the radially inner diameter of the ring corresponding to the diameters of the radially inner and outer edges respectively of the cavities present in the cheeks, the thicknesses of said spacers being greater than the sum of the axial sizes of said second annular ridges, mating of said spacers with said adjacent intermediate male dies giving rise to a hollow space therebetween which corresponds to the shape of said wall of the air tube having an annular configuration comprising a central core, determined by the mutual axial distance between said second annular ridges, and two flanges, a radially external one and a radially internal one, issuing from the corresponding ends of said core, axially extended in opposite directions, perpendicularly to said core and of a geometric configuration determined by the radial distance between said second ridges and spacers;

said pieces being mutually removable with respect to each other.

BRIEF DESCRIPTION OF THE DRAWINGS

In any case, the present invention will be better understood with the aid of the following description and the accompanying drawings, which are exclusively supplied for illustrative purposes and are not limitative, and in which.

DETAILED DESCRIPTION OF THE REFERRED EMBODIMENTS

Figure 1:
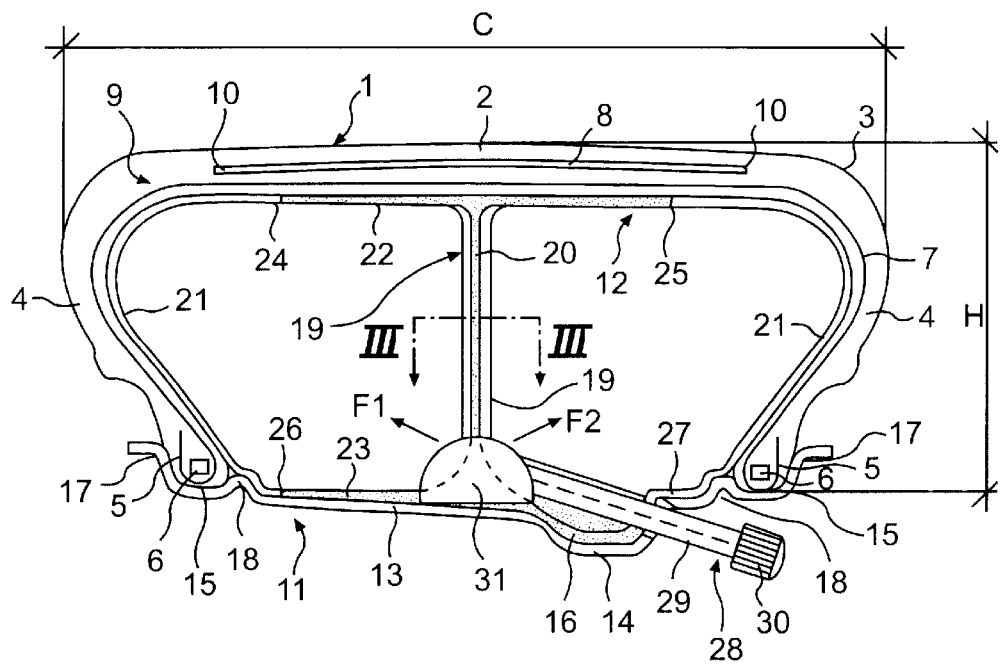
FIG. 1 shows the tire and the air tube in accordance with the invention in an axial right section.

Shown in FIG. 1 is a radial-carcass tire identified by reference numeral 1. It comprises a tread 2, shoulders 3, sidewalls 4 and beads 5 incorporating bead rings 6. The carcass of tire 1 may comprise at least one ply 9 of rubberized fabric incorporating reinforcing cords 7 disposed in meridian planes.

In the example herein described the ply ends are turned up like a flipper around the bead rings 6: this does not exclude the possibility of other embodiments in which the carcass ply ends are anchored differently from the solution shown in FIG. 1, associated for example by adhesion with the axially inner sides of the bead rings without being turned up therearound.

A reinforcing belt structure 8, axially confined by its ends 10, is interposed crownwise to the tire, between the carcass ply and tread band.

Such a belt structure may for example comprise three radially superposed reinforcing layers (not shown), two of which are provided with metallic cords parallel to each other in each layer and crossed with those of the adjacent layer, and a radially outer third layer incorporating textile cords, made polyamide for example, disposed parallelly to the equatorial plane of the tire.

The tire is mounted on a wheel rim 11 and an air tube 12 of elastomer material is disposed in the space enclosed between the rim and tire.

In the following of the present description by the term "elastomer material" it is intended the composition of the air tube material taken as a whole, that is rubber inclusive of the polymeric base, reinforcing fillers and different vulcanizing, protective, anti-aging and other agents, all that according to formulations well-known to those skilled in the art.

The rim is comprised of a base surface 13, a groove 14 intended to facilitate mounting of the tire on the rim and two bead seats 15.

The pair of tire beads 5 is locked in the respective bead seats between the rim flange 17 and an appropriate radial projection or security hump 18 formed on the base surface of the rim.

Tire 1 is of the "low-section" type, that is the type having a section ratio H/C not exceeding 0.7 wherein, with reference to FIG. 1, parameters H and C have the following meanings:

H stands for the section height, measured on the equatorial plane, between the radially innermost point of the bead and the radially outermost point of the tread band;

C stands for the section width, measured parallelly to the rotation axis, between the axially outermost points of the tire sidewalls.

In the example shown in the Figure value of ratio H/C is approximately equal to 0.4.

The invention particularly concerns low-section tires and it performs increasingly more important advantages as lowering increases; see the three tires size 85/65 R 14, 225/55 R 16, 225/35 R 18 respectively, for example. It is to note that in the size code the first number (e.g. 185) indicates the tread width expressed in millimeters, the second number (e.g. 65) indicates value of ratio H/C multiplied by 100, letter "R" indicates that the tire is of the radial type and the last number (e.g. 14) indicates the value of the tire-fitting diameter expressed in inches.

In the three above tires the value of ratio H/C progressively decreases (lowering increase) passing from 0.65 to 0.55 and, lastly, to 0.35.

The air tube 12 is divided into two distinct circumferential portions, separated by a wall 19 lying in a plane preferably orthogonal to the rotation axis and still more preferably extended in the equatorial plane, and comprises two portions distinct from each other, a central core 20 and a pair of sidewalls 21, respectively.

More preferably, the central core consists of wall 19 from the ends of which two flanges, a radially outer one 22 and a radially inner one 23 respectively, issue; said flanges are perpendicular to wall 19 and extend in axially opposite directions over a length of preestablished width.

The adjacent ends of the sidewalls and flanges are joined to each other, hose a radially outer position along the circumferential junction lines 24 and 25, those at a radially inner position along the circumferential junction lines 26 and 27. Junction is preferably carried out by chemical adhesion through vulcanization.

In the described example illustrated in FIG. 1, the two portions of each flange, the radially outer and inner ones respectively, issue from the ends of wall 19, axially in both directions, perpendicularly to said partition, over a length of same width; however, other solutions are possible in which the fight portion of the radially outer flange for example is larger than the left portion thereof and, correspondingly, the radially outer axial portion of the adjacent sidewall is narrower than that of the opposite sidewall.

In an alternative version, both wings of the radially outer flange are larger than the corresponding wings of the radially inner flange, or vice versa.

In any case, the width of said flanges is defined by the distance in an axial direction between the circumferential areas where said central wall joins said opposite sidewalls.

Preferentially, the junction areas between flanges and sidewalls at a radially outer position are axially internal to the ends 10 of belt 8.

At all events, the width of said flanges is conveniently governed by the value of the tire section ratio which increases as lowering increases, which width is preferably included, at least in the radially outer flange, between approximately 40% and 80% of the belt 8 width.

For example, in a tire size 225/60R16 the axial width or the radially outer flange is preferably included between 60 and 130 mm.

As will be more apparent in the following, the width of the radially inner flange is less critical than that of the radially outer flange.

In the following of the present description, for the sake of simplicity, reference will be made to a symmetric air tube relative to the equatorial plane, having a wall 19 lying in said plane, but a person skilled in the art after understanding the invention will be easily able to vary the air tube geometry depending on its specific requirements.

According to one aspect of the invention, accomplishment of an air tube of different rigidity in its distinct portions has been provided, and more specifically an air tube having a core provided with greater rigidity than the sidewalls. In a preferential solution shown in FIG. 1, where the different air tube parts have been made using the same elastomer material, the greater rigidity of the core relative to the sidewalls has been achieved by conveniently increasing the transverse section (thickness) of the core relative to the sidewalls. The ratio between the average value of the core thickness and that of the sidewall thickness in the preferred embodiments of the invention may vary between 1 and 4. In more detail, in the example shown in FIG. 1 the air tube has a thickness of 5 rpm, which is constant along wall 19, greater at the connecting area between the wall and flanges and then tapers until it reaches a value of 2 mm at the junction area with the sidewalls, which value stays constant in said sidewalls. In an alternative solution, the greater rigidity of the core relative to the sidewalls is obtained with the and of materials different from each other by adopting an elastomer material for the core of a greater modulus than that for the sidewalls: in this case the core thickness may be the same as the sidewalls' or different therefrom.

In the preferred alternative embodiments in accordance with the invention the ratio between the material moduli of the core and sidewalls respectively can be included in a value range of 1 to 10, and more preferably it is included between 1 and 5.

The value of the material modulus of the core is preferably included between 1.5 and 10 N/mm$^2$.

It is pointed out that by the term "modulus" it is herein intended the nominal value of the effort corresponding to an elongation deformation of 100%. Measurement of the modulus value is carried out following ISO 37 standard rule (Ring type A).

Preferentially, the air tube sidewalls can be made of butyl rubber or halogen butyl rubber, and the central core can be made of diene elastomer materials such as, among others, stirene-butadiene, polybutadiene, natural rubber.

In a further solution, the greater rigidity of the core relative to the sidewalls can be made using materials of the same or different composition, having he same or different thicknesses, resorting to incorporation of appropriate reinforcing fillers into said materials; in a preferential solution these fillers are comprised of short fibres (sizes equal to or lower than 7 mm), in particular those obtained by grinding an aramidic fibre (sizes as low as 1 mm or less), known as "aramide pull" (Kevlar®-Pulp or Twaron®-Pulp, for example), wherein Kevlar and Twaron are registered trademarks belonging to Du Pont and AkZO, respectively.

Preferably, the amount of said short fibres is included between 1 and 5 phr (parts by weight for one hundred parts of rubber); in a particular preferred embodiment, only the elastomer material of the core contains these fibre fillers.

Preferably, a different rigidity is also imposed to he different parts of the central core, at all events giving the maximum rigidity to the radially inner flange, relative to the rigidity of the wall and the radially outer flange, in order to govern the expansion of the air tube walls during inflation thereof in an optimal manner, thereby enabling a complete adaptation of these walls to the inner tire surface.

Preferably, one of the two axial portions of the radially inner flange of the core has a bulge 16, formed by an appropriate thickening of the flange wall for example, projecting radially towards the rotation axis of said air tube, intended for abutment, during the air tube inflation, against the inside of a corresponding groove 14 of the mounting rim.

+++++

Advantageously, partition 19 holds at least one duct 32 extending internally over the whole radial extension of said wall, opening on both the extrados and intrados surfaces of the air tube. Preferably, the air tube is comprised of a plurality of these ducts, that are uniformly spaced circumferential from each other, that is mutually spaced of the same angular amount.

Figure 3:
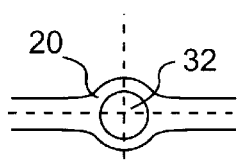
FIG. 3 shows a partial section of the air tube wall taken along line III—III in FIG. 1.

Preferably, these ducts are at least three, but more preferably their number is greater and most preferably they are at least 6 in number. FIG. 3 shows one of ducts 32 in a transverse section, which ducts preferably have a diameter included between 3 and 15 mm. In the embodiment shown in FIG. 3 this duct has a diameter of about 12 mm.

Due to the presence of these ducts, during the air tube inflation, the air still entrapped between the radially outer surface (extrados surface) of the air tube and the radially inner surface of the tire crown portion is allowed to outflow towards the space included between the radially inner surface (intrados surface) of the air tube and the faced surface of the rim, and therefrom towards the surrounding atmosphere through hole 33 formed in the rim base and intended for defining the housing seat of the stem of an inflation valve.

For the purpose of inflating and deflating the two independent parts into which the air tube is divided, said air tube may comprise two distinct valves of the traditional type or, alternatively, a single valve 28 comprising an usual cylindrical stem 29 provided at one end thereof, the external one, with a closing cap 30.

A cylindrical body, a rod (not shown) for example, is provided within the cylindrical stem, which rod can be switched over between two distinct positions, one of which enables an air flow in opposite directions whereas the other stops said flow in both directions, for closing or allowing passage of the air flow through the valve, respectively: switching can be for example carried out to advantage by screwing the rod in one direction and unscrewing it in the opposite one relative to the valve stem.

At the opposite end, the valve stem is incorporated in a protuberance 31 of elastomer material formed in the radially inner area of he core, which connects the wall 19 with the flange 23.

This protuberance 31, of semispherical form for example, has two separated ways for a simultaneous air flow towards the two distinct parts of the air tube, in the direction denoted by arrows F1, F2 in FIG. 1 and is provided with a nonreturn device (known per se and not shown) stopping the air flow between said distinct parts of the air tube.

Alternatively, the air passage between the two distinct parts of the air tube may be stopped by varying the position of the rod relative to the cylinder.

Figure 2:
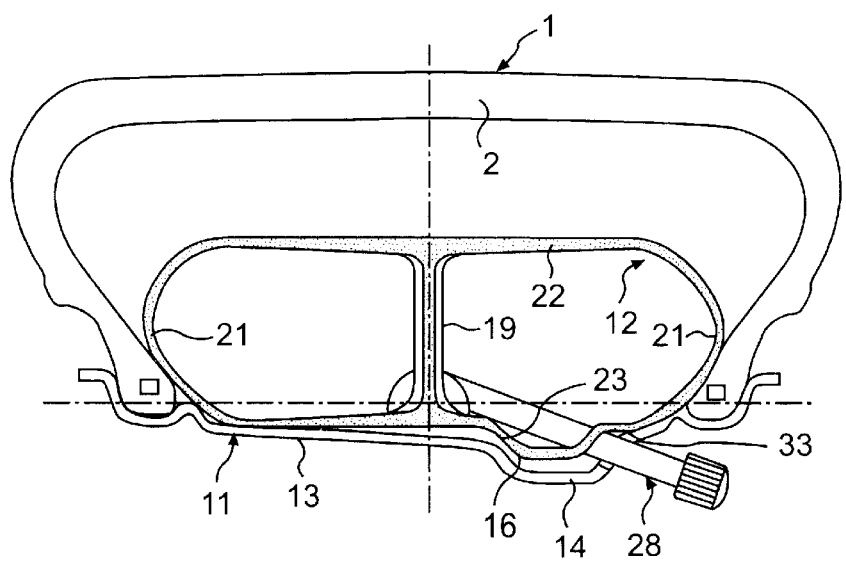
FIG. 2 shows the air, tube of FIG. 1 during inflation within the tire of FIG. 1.

FIG. 2 shows the inflation starting step of the air tube and its settlement in the space included between the tire and rim, after being introduced into the tire. Before its introduction, the air tube has been conveniently put in a state of slight inflation, so as to create a consistency useful to promote subsequent centering of the air tube relative to the valve stem, fitted into the rim hole 33 and locked therein, and in order to avoid formation of folds and similar inconveniences that could damage the air tube body.

After both beads have abutted against the corresponding bead seats, inflation is carried out by blowing air under pressure into the air tube: by effect of the different, greater, rigidity of the core relative to the sidewalls, these latter expand much more than wall 19, coming into contact with the tire sidewalls before the radially outer flange of the central core has abutted against the radially inner surface of the tire crown portion. As the inflating action goes on, the air tube sidewalls progressively lean on the tire sidewalls advancing radially outwardly, thereby progressively reducing the space included between the extrados surface of the air tube and the radially inner surface of the tire crown portion, until this extrados surface too completely leans (FIG. 1) on the corresponding tire wall.

During this step, the air still entrapped in this space is easily evacuated through ducts 32 formed in the wall 19 thickness, which ducts convey the air on the intrados surface of the air tube, towards the space included between the air tube and rim, said air being then evacuated therefrom by escape through the clearance defined between the hole 33 and stem 29 of valve 28 contained in said hole. When all the radially outer portion of the air tube has come in abutment against the corresponding tire wall, a further increase in the inflating pressure causes pressing of the radially inner flange too of the air tube against the corresponding base surface of the rim, thereby accomplishing a complete filling of the toroidal tire cavity and an optimal extension of the air tube walls against the opposition surfaces of the tire and rim.

Figure 4:
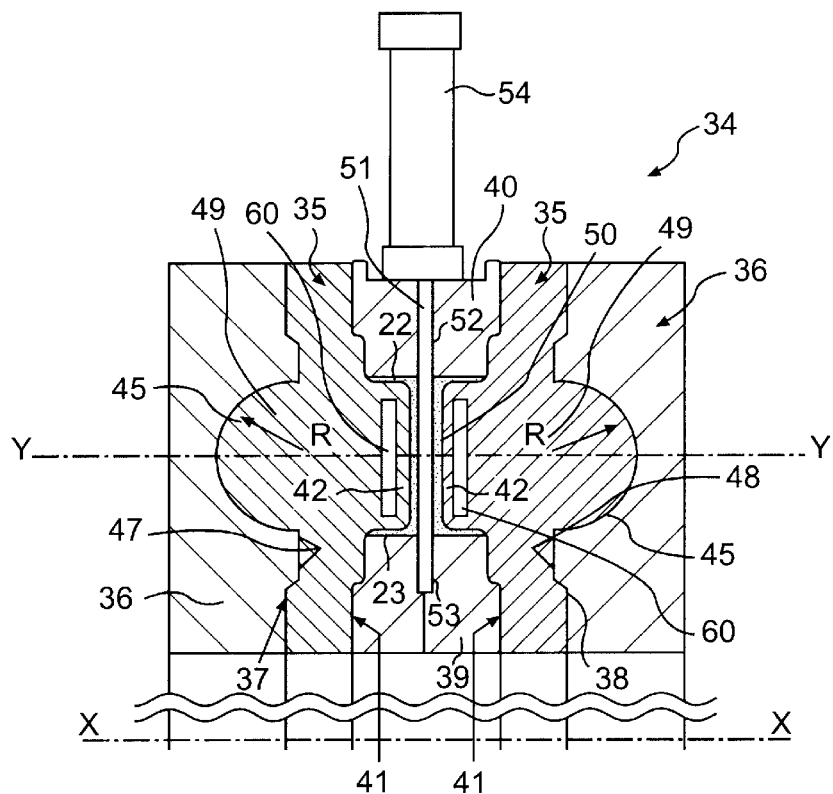
FIG. 4 shows a mould according to the invention for manufacturing the air tube seen in FIG. 1.

FIG. 4 discloses a mould 34 for manufacturing the air tube previously described, still with reference to the particular version of a symmetric air tube relative to an equatorial plane, provided with a central radial partition having two axial flanges at the ends thereof.

In one preferential embodiment, the mould of the invention is a mould formed of several pieces delimiting three distinct cavities; it is fed from an injection press, not shown, for the simultaneous formation of the air tube 12 core and a pair of sidewalls.

More specifically, this mould is comprised of a pair of axially external cheeks 36, a pair of axially intermediate male dies 35 and a pair of axially internal spacers 39, 40 radially coaxial with each other, all mutually displaceable and in particular removable with respect to each other; the reference axis or mutual arrangement of said pieces is the rotation axis X—X of the air tube being formed.

The two cheeks 36 have an annular cavity 45 on their mutually facing surfaces, which cavity is coaxial with axis X—X and of substantially semicircular right section: in the case shown the radially outer and radially inner edges of each cavity lie in one and the same plane normal to axis X—X, but other solutions are also possible; for instance, said edges may lie on a conical surface the vertex of which is on axis X—X, or said cavity may have a right section different from a semicircular one.

The two intermediate male dies 35 have their axially outer surfaces 37, 38 such shaped as to mate with the corresponding axially inner surfaces 47, 48 of the faced cheeks; in particular, said male dies are provided, on said surfaces, with a first annular ridge 49, coaxial with axis X—X, of semicircular right section, which ridge, when the mould is closed, is housed in the corresponding annular cavity 45 of the adjacent cheek.

More specifically, the radius R of said annular ridge is smaller than the radius of the corresponding cavity so as to define a hollow space of preferably constant width, corresponding to one sidewall of the air tube.

Said intermediate male dies 35, on their axially inner surfaces 41 have a second annular ridge 42, coaxial with axis X—X and in axial alignment according to axis Y—Y with the first annular ridge, having a right section of substantially quadrangular and preferably rectangular shape with rounded corners, or a generally trapezoidal shape.

The bases of said first and second annular ridges, that is the maximum radial sizes of said ridges are substantially identical with each other, as better clarified in the following.

In an axially inner position, two spacers 39 and 40 are housed between said intermediate male dies, i.e. a disc 39 and a concentric ring 40 respectively, and they too are coaxial with axis X—X.

The diameter of disc 39 is smaller than the radially inner diameter of ring 40 and the difference between said diameters substantially corresponds to the radial size of the above described annular ridges. More specifically, the diameter of disc 39 and the radially inner diameter of ring 40 correspond to the diameters of the radially inner and radially outer edges respectively of cavities 45 present in cheeks 36.

The thickness of the two spacers, at least at their faced edges, is greater than the sum of the axial sizes of said second annular ridges, so that matching of spacers with the adjacent intermediate male dies gives rise to a hollow space 50 therebetween which corresponds to the shape of the air tube core; in particular, the mutual axial distance between said second annular ridges determines the thickness of wall 19, whereas the radial distance between said second ridges and spacers determines the geometric configuration and thickness of flanges 22, 23 and connecting areas between said flanges and the core wall.

All surfaces axially facing the adjacent surfaces are such shaped as to have complementary mating elements (inclined surfaces, protuberances and cavities) that, by abutting against each other, block any relative displacement in a racial direction between the contact surfaces, thereby ensuring a correct and steady mutual positioning between the different parts of the mould.

The mould further contemplates the presence of lock devices to make the concentric spacers 39, 40 integral with each other; in a preferential embodiment these lock devices coincide to advantage with the devices required for forming ducts 32 (FIG. 3) for air outflow from the extrados area to the intrados area of the air tube during inflation of the tire mounted on the respective rim (FIG. 2).

Figure 5:
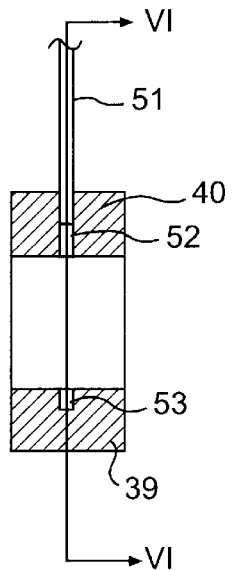
FIG. 5 shows a detail of the mould seen in FIG. 4.
Figure 6:
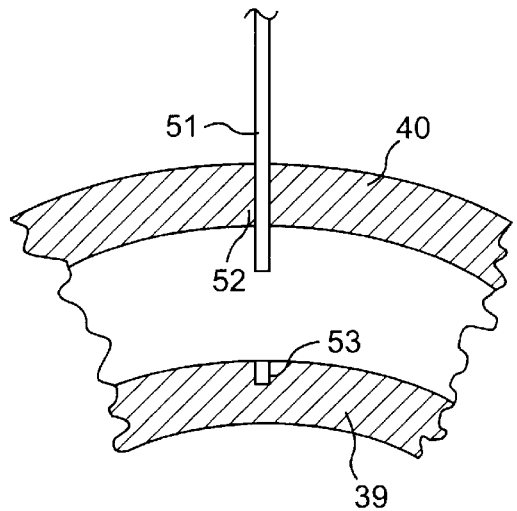
FIG. 6 shows the detail of FIG. sectioned along line VI—VI in FIG. 5.

More specifically, said lock devices are comprised of at least one, more preferably at least three, and most preferably more than three studs 51, that are radially movable in both directions along through holes 52 (FIGS. 4–6) provided on the outer ring 40, to be inserted in and drawn out of corresponding housings 53 formed in the inner disc 39 edge. Preferably these studs are circumferential spaced apart from each other in a uniform manner.

Introduction and drawing out of studs is carried out by resorting to varied means known per se, such as for example mechanical drawing pliers or more preferably fluid-operated control devices 54, as diagrammatically shown in FIG. 4.

The manufacturing steps of the air tube are carried out as follows.

First of all the mould is arranged in the closed condition shown in FIG. 4.

By means of channels (not shown) formed in some of the parts forming the mould, but preferably all formed in the pair of intermediate male dies, and opening into the first and second annular ridges, the provided elastomer material is injected at high pressure, into the three hollow spaces generated by mating of said male dies with cheeks and spacers respectively, until the three distinct parts of the air tube (two sidewalls and the central core) are moulded, as shown in FIG. 4.

Preferably, after injection, the wall 19 is at least partly vulcanized (semi-vulcanization), due to its greater thickness, by the use for example, of heating elements (preferably cavities 60 supplied with fluids at high temperature or other known systems, such as electric, induction, microwave devices and the like) inserted in the second annular ridges of the intermediate male dies 35, close to said wall 19.

On the contrary, the two wings of flanges 22 and 23 are preferably kept cold, and therefore at a raw state, by means of appropriate devices, in order to facilitate subsequent joining to the ends of sidewalls 21.

Figure 7:
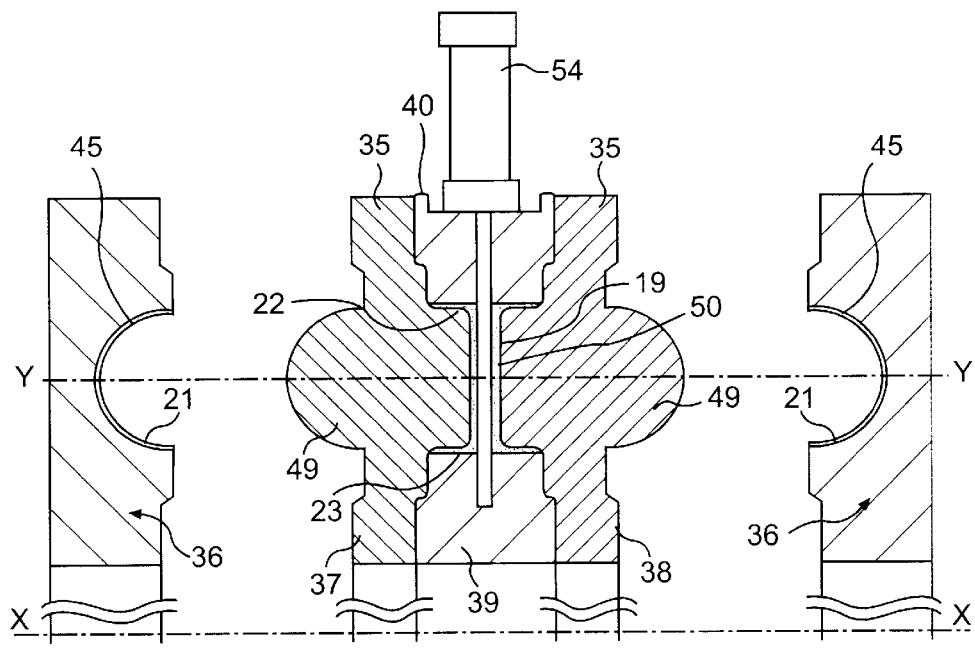
FIGS. 7–8 show the successive steps for disassembling the mound after moulding of the different air tube parts.
Figure 8:
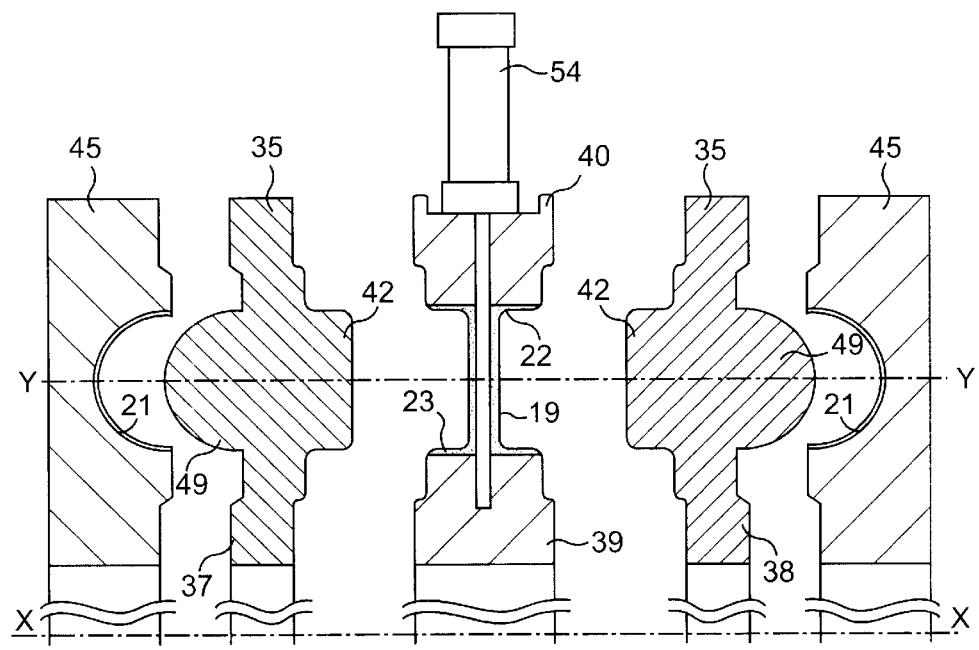

Afterwards (FIG. 7) the different mould parts are disassembled starting from axially moving the two cheeks, with which sidewalls 21 are associated, apart from each other; then the two intermediate male dies are removed, first (FIG. 8) by mutually moving them apart in an axial direction and subsequently by transversely moving them apart, for example in a radial direction normal to axis X—X of the mould.

Then the two cheeks are axially moved close to each other (FIG. 9) unto they abut against the facing surfaces of the two spacers 39, 40 with the assembly of which the core of the air tube is associated.

Figure 9:
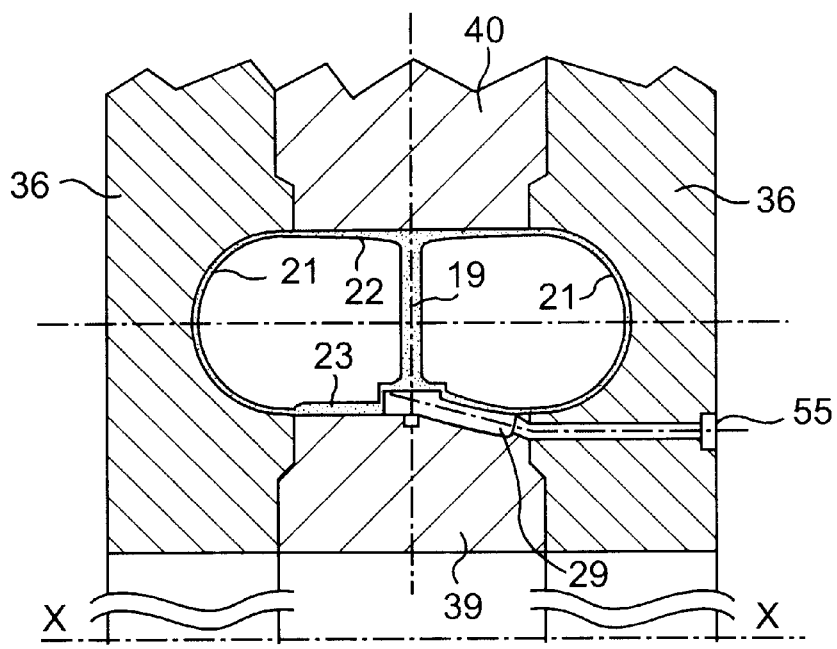
FIG. 9 shows the re-assembled mould at the beginning of the step of vulcanizing and welding the distinct parts of the air tube.

As clearly shown in FIG. 9, the ends of the core flanges 22, 23 are now in contact with the corresponding ends of sidewalls 21.

Preferably, in order to make the junction stronger, the core and sidewall surfaces in mutual contact are diagonally cut, that is they taper so as to form a junction by overlapping without thickness increase at the joining area.

In a preferential embodiment of the process in accordance with the invention the air tube core is provided to be already equipped with the valve body 28, moulded together with said part or joined thereto during the elastomer material injection, since it has been previously inserted in an appropriate housing provided in the inner disc 39 before starting the injection step.

Then, vulcanization of the air tube is finally carried out by sending a fluid (e.g. air or steam) at a temperature of about 150° C. and a pressure of about 10 bars through a duct 55 provided in cheek 35 and therefrom through the valve body 28 into the inner space of the air tube, thereby involving, as a result, pressing and moulding of the air tube walls against the inner surfaces of cheeks 36 and spacers 39, 40.

During the vulcanization step, a chemical junction between the sidewall ends and he corresponding core flanges takes place.

The air tube is now extracted from the mould: for the purpose, the mould is opened by first moving one of the two cheeks 36 away from the closed configuration kept during vulcanization, the studs 51 are pulled out of disc 39, so that they enter ring 40 and are slipped off the central partition 10 of the core (FIG. 4) and finally the air tube is pulled out of the residual mould portion.

Now, re-assembling of the different mould parts, inclusive of the intermediate male dies, is carried out, so that a new air tube can be manufactured.

The operation in particular involves starting with the mutual association of the two concentric spacers 39, 40 carried out by means of the respective lock devices, in particular by fitting the various studs 51 again into the corresponding housings 53 of disc 39.

Preferably, during the initial steps for re-assembling the mould a new valve body 28 is inserted into the appropriate housing provided in the inner disc 39.

Finally, the intermediate male dies 35 are brought again against the faced surfaces of soccers 39, 40, and cheeks 36 are closed again against the intermediate male dies 35 until the closed configuration of FIG. 4 is reached.

The mould is now ready to repeat the air tube manufacturing sizes in accordance with the invention, already described with reference to FIGS. 4 to 9.

All movements of the different mould parts can be carried out with the aid of appropriate handling devices, herein not shown.

Obviously, the mould herein described in its preferential embodiment can undergo several construction modifications depending on requirements of those skilled in the art.

For example, the use of two distinct moulds may be provided instead of a single mould, e.g. a first mould for core formation and a second mould for sidewall formation.

In any case the manufacturing process is based on moulding the air tube core and sidewalls separately from each other and then bringing the core flanges of the already moulded core into contact with the corresponding circumferential edges of the two sidewalls, already moulded as well, in order to cause the core and sidewalls to be joined together, by vulcanization, along junction lines consisting of said contact areas.

While the air tube of the invention is particularly intended for low-section tires, it can be usefully employed with tires of any sections by suitably varying, in connection with the intended tire size, the extension of the central core flanges.

As already said, the air tube of the invention advantageously constitutes a safety device intended to keep the tire under stability conditions even when it is partly deflated as a result of the air tube being punctured.

Thus the invention offers a method of ensuring running under deflated conditions to a tire for vehicle wheels comprising, a carcass of toroidal shape having a crown portion and two axially opposite sidewalls that together delimit an inner cavity of said tire, said method comprising the steps of:

defining two independent circumferential volumes disposed in axial side by side relationship within said tire cavity;

delimiting said volumes by an independent air tube, of elastomer material, inserted in said cavity, comprising an internal wall extending in a plane normal to the rotation axis of said tire and a pair of axially opposite sidewalls;

providing said wall with a tensile strain capability smaller than the corresponding tensile strain capability of said sidewalls.

Figure 10:
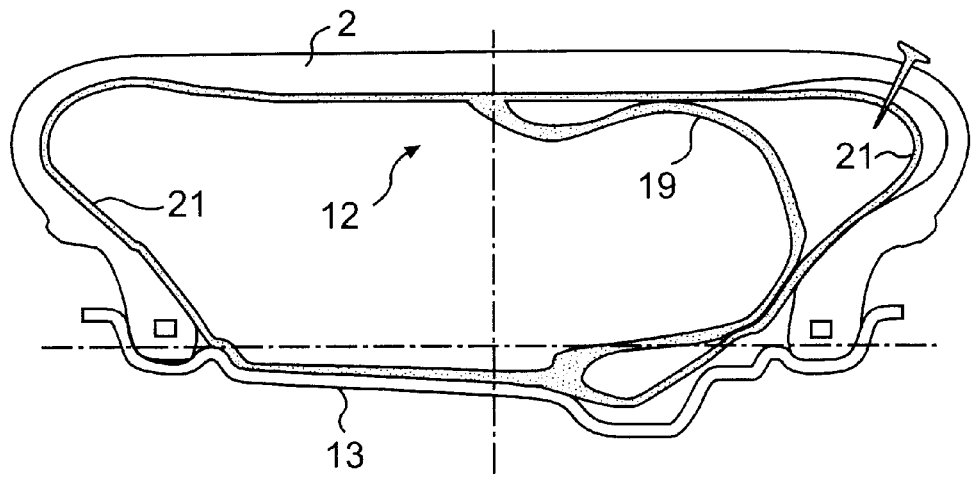
FIG. 10 shows the tire and air tube seen in FIG. 1 in partial right section in a condition of partial deflation of the air tube.

In this connection FIG. 10 shows the inventive tire in a condition of partial deflation of the air tube due to a puncture in one of the two distinct volumes: in particular it shows the deformed shape of wall 19.

In the condition shown the air tube part located to the right of wall 19 has undergone a complete deflation following a puncture caused by a sharp pointed object that has pierced the tire body.

Wall 19 is now subjected, on its left side, to an air pressure corresponding to the working pressure and on its right side to the atmospheric pressure.

Consequently, wall 19 is subjected to deformation, the air tube portion still under pressure within the tire being expanded and occupying the deflated area at least partly, thereby supporting the tire substantially at the whole ground-contacting area thereof, and also keeping pressure in the active part of the air tube to a value at least corresponding to 50% of the pressure value before puncture.

In this correction it is pointed out that the unbalance condition of pressures acting in the two areas at the sides of wall 19 generates stresses therein that are borne due to the greater rigidity (lower deformation capability) of the wall itself relative to the values of known air tubes which, on the contrary, under this situation can undergo damages and tearing actions that make them immediately useless.

Advantageously, the air tube of the invention, by keeping the tire in a running condition, eliminates the risk of a forced immobility of the vehicle.

In this way, resorting to a spare tire can be avoided and, as a result, the weight carried by the vehicle is lower, spaces for passengers' comfort are greater and costs for equipping the vehicle with accessories are more reduced.

The invention also overcomes the difficulty connected with the fact that an air tube formed of parts moulded separately and subsequently joined together has a lower strength than air tubes of one piece construction, and consequently a shorter lifetime, in that junctions represent weakness areas adversely affecting the manufactured-article duration. The difficulty has always drove users to adopt solutions with air tubes of one piece construction and, as regards low-section tires, to favour the tubeless solution instead of the solution with an air tube.

In accordance with the invention, the present solution contemplates junction areas between flanges 22, 23 and sidewalls 21 disposed at tire parts that are substantially clear of bending deformations, which are dangerous for junction integrity: more specifically, particularly advantageous is the combination of an air tube within a radial tire provided with a belt structure according to which at least the junction areas between the radially outer flange of the central core and the air tube sidewalls are axially internal to the belt ends. This solution ensures a long lifetime of the air tube in that the junction areas are pressed against a substantially non-deformable structure, and opening thereof is practically impossible.

The junction areas between the radially inner flange of the core and the air tube sidewalls, as they are pressed against the metal rim surface, are instead, in any case, clear of bending deformations and therefore, under this point of view, do not represent critical elements for the air tube strength.

In addition, advantageously the air tube of the invention is a fundamental part of a tire wheel comprising a tire mounted on a rim, with the air tube of the invention inserted between the tire and rim: this solution enables resorting to structural variations of the tire carcass to be avoided, which variations may require corresponding modifications of the rim, as on the other hand is necessary in many tubeless tires of the known art.

According to a further aspect, the air tube of the invention can be also employed as a vulcanization bladder for tread pattern moulding and tire vulcanization in place of known bladders installed on tire vulcanization presses; during the vulcanization process the air tube in accordance with the invention as joined to the carcass thereby forming a single body with the vulcanized tire, so as to enable the advantageous elimination of the air-tight liner usually required in tubeless types as an element for ensuring air-tightness within the tire.

In accordance with this aspect, the invention offers a method of manufacturing a tire for vehicle wheels, of a type adapted to ensure running under deflated conditions, comprising a carcass of toroidal form having a crown portion and two axially opposite sidewalls delimiting an inner tire cavity, characterized in that it comprises the steps of:—dividing this cavity into two independent circumferential volumes by insertion, in the cavity of the raw carcass, of an air tube of elastomer material comprising an interior wall extending in a plane normal to the rotation axis of said tire and a pair of axially opposite sidewalls, said wall having a tensile strain capability lower than the corresponding strain capability of said sidewalls;—inserting the raw carcass into a vulcanization mould;—inflating the air tube with fluid to a temperature and pressure as provided by the tire vulcanization cycle;—vulcanizing the raw carcass making the air tube integral thereto.

In accordance with this method of the invention, a tire for vehicle wheels is made available, of the type adapted to ensure running under deflated conditions comprising a carcass of toroidal form having a crown portion and two axially opposite sidewalls defining an inner cavity, characterized in that this cavity is divided into two independent circumferential volumes by an air tube of elastomer material, integral with the carcass, comprising a central core extended in a plane normal to the tire rotation axis, the value of the material modulus of said core being preferably included between 1.5 and 10 N/mm$^2$.

Another aspect of the invention consists in manufacturing the air tube based on moulding of the core and sidewalls separately from each other.

Following this technique it is possible to use rubber materials different from each other for forming the sidewalls and central core, therefore providing said parts differentiated features (high flexibility to the sidewalls, lower flexibility to the central core) which cannot be obtained with traditional manufacturing processes for air tubes, using a single mould.

In particular, manufacturing of an air tube according to the invention, carried out with high-pressure injection steps advantageously enables spaces delimited by very small radii of curvature, as required in the curvilinear portions intended to form connections between wall 19 and flanges 22, 23, to be completely and perfectly filled, in short periods of time, with elastomer material charged with reinforcing fibre fillers.

What is claimed is:

1. A low-section tire for a vehicle wheel, comprising:
   a carcass; and
   an air tube;
   wherein the carcass comprises a toroidal form,
   wherein the carcass further comprises a crown portion and two axially-opposite carcass sidewalls delimiting an inner cavity,
   wherein the air tube comprises an elastomer material,
   wherein the air tube further comprises an internal wall and a pair of axially-opposite air tube sidewalls,
   wherein the internal wall separates the air tube into at least two distinct circumferential portions,
   wherein the internal wall extends in a plane substantially normal to a rotation axis of the air tube,
   wherein, when fully inflated, the air tube further comprises a right section in a meridian plane that is substantially elliptical, with a major axis parallel to the rotation axis of the air tube, and
   wherein a rigidity of the internal wall is greater than a rigidity of the air tube sidewalls so that, when the carcass and the air tube are mounted on a rim, and during inflation of the air tube, the air tube sidewalls contact the carcass sidewalls before a time when a radially-outer portion of the internal wall contacts a radially-inner surface of the crown portion.

2. The low-section tire of claim 1, wherein a ratio of a modulus of an elastomer material of the internal wall to a modulus of an elastomer material of the air tube sidewalls is greater than or equal to 1:1 and less than or equal to 10:1.

3. The low-section tire of claim 1, wherein the air tube comprises a central core,
   wherein the central core comprises the internal wall and two flanges,
   wherein each flange extends perpendicularly to the internal wall in axially-opposite directions,
   wherein ends of the flanges are joined to corresponding ends of the air tube sidewalls, and
   wherein a rigidity of the central core is greater than the rigidity of the air tube sidewalls.

4. The low-section tire of claim 3, wherein a thickness of the central core is greater than a thickness of the air tube sidewalls.

5. The low-section tire of claim 4, wherein the central core and the air tube sidewalls comprise a same elastomer material.

6. The low-section tire of claim 3, wherein a modulus of an elastomer material of the central core is greater than a modulus of an elastomer material of the air tube sidewalls.

7. The low-section tire of claim 6, wherein a value of the modulus of the elastomer material of the central core is greater than or equal to 1.5 N/mm$^2$ and less than or equal to 10 N/mm$^2$.

8. The low-section tire of claim 6, wherein a ratio of the modulus of the elastomer material of the central core to the modulus of the elastomer material of the air tube sidewalls is greater than or equal to 1:1 and less than or equal to 10:1.

9. The low-section tire of claim 6, wherein the elastomer material of the central core comprises a first reinforcing filler, and
   wherein the elastomer material of the air tube sidewalls comprises a second reinforcing filler different from the first reinforcing filler.

10. The low-section tire of claim 6, wherein the elastomer material of the central core comprises first reinforcing fillers, and
    wherein the elastomer material of the air tube sidewalls comprises second reinforcing fillers different from the first reinforcing fillers.

11. The low-section tire of claim 6, wherein the elastomer material of the central core comprises short fibers produced by grinding.

12. The low-section tire of claim 1, wherein the internal wall comprises at least one duct extending through the internal wall, and
    wherein the at least one duct is open on both extrados and intrados surfaces of the air tube.

13. The low-section tire of claim 12, wherein the at least one duct comprises a plurality of ducts circumferentially spaced apart from each other.

14. The low-section tire of claim 1, further comprising at least one valve for simultaneous inflation and deflation of the at least two distinct circumferential portions.

15. The low-section tire of claim 14, wherein the at least one valve comprises a cylindrical body for switching between two different positions,
    wherein a first position enables an air flow in opposite directions,
    wherein a second position stops air flow in both of the opposite directions,
    wherein the cylindrical body is connected to a protuberance incorporated in an elastomer material of a central core, wherein the cylindrical body is disposed in a radially-inner connecting area between the central core and a corresponding flange, wherein the protuberance comprises separate paths for air flow into the at least two distinct circumferential portions, wherein a nonreturn device stops air flow between the at least two distinct circumferential portions, and wherein the cylindrical body projects outwardly from the protuberance.

16. The low-section tire of claim 3, wherein the two flanges comprise a radially-inner flange and a radially-outer flange, wherein the radially-inner flange comprises two axial portions, and wherein one axial portion of the radially-inner flange comprises a bulge radially projecting toward the rotation axis of the air tube for fitting into a corresponding groove of the rim.

17. A tire wheel, comprising:

a rim; and a low-section tire mounted on the rim;

wherein the low-section tire comprises:
a carcass;
an air tube; and
a belt structure disposed crownwise on the carcass;

wherein the carcass comprises a toroidal form, wherein the carcass further comprises a crown portion and two axially-opposite carcass sidewalls delimiting an inner cavity, wherein the air tube comprises an elastomer material, wherein the air tube further comprises an internal wall and a pair of axially-opposite air tube sidewalls, wherein the internal wall separates the air tube into at least two distinct circumferential portions, wherein the internal wall extends in a plane substantially normal to a rotation axis of the air tube, wherein, when fully inflated, the air tube further comprises a right section in a meridian plane that is substantially elliptical, with a major axis parallel to the rotation axis of the air tube, and wherein a rigidity of the internal wall is greater than a rigidity of the air tube sidewalls so that, when the carcass and the air tube are mounted on the rim, and during inflation of the air tube, the air tube sidewalls contact the carcass sidewalls before a time when a radially-outer portion of the internal wall contacts a radially-inner surface of the crown portion.

18. The tire wheel of claim 17, wherein the tire comprises a first substantially-elliptical transverse section, wherein the air tube comprises a second substantially-elliptical transverse section, and wherein the tire comprises a ratio of section height to section width not greater than 0.7:1.

19. The tire wheel of claim 17, wherein junction areas of a radially-outer portion of a central core of the air tube to the air tube sidewalls are axially internal to ends of the belt structure.

20. The tire wheel of claim 19, wherein an axial distance between the junction areas is greater than or equal to 40% of a width of the belt structure and less than or equal to 80% of the width of the belt structure.

21. A process for manufacturing an air tube of elastomer material, comprising:

moulding a pair of air tube sidewalls separated from each other;

moulding a central core of the air tube in an annular configuration, wherein the central core comprises an internal wall and two flanges;

arranging the air tube sidewalls and the central core in a single vulcanization mould, wherein opposing ends of the air tube sidewalls are disposed coaxially with each other and mutually face each other, and wherein the central core is disposed between the opposing ends of the air tube sidewalls and coaxially with the air tube sidewalls;

closing the vulcanization mould to form an air tube comprising the air tube sidewalls and the central core, wherein ends of the flanges contact corresponding ends of the air tube sidewalls, and wherein the internal wall separates the air tube into at least two distinct circumferential portions;

feeding pressurized fluid at a preestablished temperature into the at least two distinct circumferential portions; and vulcanizing the air tube to join the central core to the air tube sidewalls;

wherein the internal wall extends in a plane substantially normal to a rotation axis of the air tube, wherein the flanges comprise a radially-external flange and a radially-internal flange, and wherein each flange extends perpendicularly to the internal wall in axially-opposite directions.

22. The process of claim 21, wherein moulding the pair of air tube sidewalls and the central core comprises injecting the elastomer material into cavities in the vulcanization mould.

23. The process of claim 21, wherein a rigidity of the central core is greater than a rigidity of the air tube sidewalls.

24. The process of claim 21, wherein a rigidity of the internal wall is greater than a rigidity of the air tube sidewalls.

25. The process of claim 21, wherein the central core comprises an elastomer material comprising short fibers obtained by grinding.

26. The process of claim 21, wherein the internal wall comprises an elastomer material comprising short fibers obtained by grinding.

27. The process of claim 21, wherein the internal wall is at least partly vulcanized before arranging the air tube sidewalls and the central core in the vulcanization mould.

28. A mould for manufacturing an air tube of elastomer material, comprising:

a pair of axially-external cheeks;

of axially-intermediate male dies; and a pair of axially-inner spacers;

wherein each cheek comprises, at a surface facing an opposing cheek, an annular cavity of substantially-semicircular right section, coaxial with a rotation axis of the air tube, wherein each die comprises an axially-outer surface and an axially-inner surface, wherein, for each die, the axially-outer surface comprises a first annular ridge coaxial with the rotation axis of the air tube, wherein the first annular ridge comprises a semicircular right section, wherein, when the mould is closed, the first annular ridge is housed in a corresponding annular cavity of an adjacent cheek, wherein a radius of the first annular ridge is smaller than a radius of the corresponding annular cavity so as to delimit, when the mould is closed, a hollow space of a width corresponding to a sidewall of the air tube, wherein, for each die, the axially-inner surface comprises a second annular ridge coaxial with the rotation axis of the air tube, wherein the second annular ridge is axially aligned with a corresponding first annular ridge, wherein the second annular ridge comprises a right section of substantially quadrangular shape, wherein maximum radial sizes of the first and second annular ridges are substantially identical, wherein the spacers comprise a radially-inner disc and a radially-outer concentric ring, wherein the disc and the ring are coaxial with the rotation axis of the air tube, wherein a diameter of the disc is less than a radially-inner diameter of the ring, wherein the diameter of the disc corresponds to a diameter of a radially-inner edge of the annular cavities, wherein the radially-inner diameter of the ring corresponds to a diameter of a radially-outer edge of the annular cavities, wherein a thickness of the spacers is greater than a sum of axial sizes of the second annular ridges, wherein mating of the spacers with the dies forms a hollow space corresponding to a shape of a central core of the air tube, wherein the shape of the central core is determined by a mutual axial distance between the second annular ridges and by a geometric configuration determined by a radial distance between the second annular ridges and spacers, wherein the central core comprises an annular configuration comprising an internal wall and two flanges, wherein the internal wall separates the air tube into at least two distinct circumferential portions, wherein the internal wall extends in a plane substantially normal to the rotation axis of the air tube, wherein each flange extends perpendicularly from the internal wall in axially-opposite directions, wherein the flanges comprise a radially-external flange and a radially-internal flange, and wherein the cheeks, dies, and spacers are mutually removable with respect to each other.

29. The mould of claim 28, further comprising means for keeping the disc and ring integral with each other.

30. The mould of claim 29, wherein the means comprises at least one stud, radially movable in both directions through a corresponding hole provided in the ring, to be inserted into and drawn out of a corresponding housing formed in the disc.

31. The mould of claim 28, further comprising heating means in the second annular ridges close to axially-inner surfaces of the second annular ridges.

32. A low-section tire for a vehicle wheel, comprising;
a carcass; and
an air tube;
wherein the carcass comprises a toroidal form,
wherein the carcass further comprises a crown portion and two axially-opposite carcass sidewalls delimiting an inner cavity, wherein the air tube comprises an elastomer material, wherein the air tube further comprises an internal wall and a pair of axially-opposite air tube sidewalls, wherein the internal wall separates the air tube into at least two distinct circumferential portions, wherein the internal wall extends in a plane substantially normal to a rotation axis of the air tube, wherein, when fully inflated, the air tube further comprises a right section in a meridian plane that is substantially elliptical, with a major axis parallel to the rotation axis of the air tube, and wherein a rigidity of the internal wall is greater than a rigidity of the air tube sidewalls so that, when the carcass and the air tube are mounted on a rim, and during inflation of the air tube, a radially-outer portion of the internal wall contacts a radially-inner surface of the crown portion simultaneously with a complete lying down of the air tube sidewalls against the carcass sidewalls.

33. The low-section tire of claim 32, wherein a ratio of a modulus of an elastomer material of the internal wall to a modulus of an elastomer material of the air tube sidewalls is greater than or equal to 1:1 and less than or equal to 10:1.

34. The low-section tire of claim 32, wherein the air tube comprises a central core, wherein the central core comprises the internal wall and two flanges, wherein each flange extends perpendicularly to the internal wall in axially-opposite directions, wherein ends of the flanges are joined to corresponding ends of the air tube sidewalls, and wherein a rigidity of the central core is greater than the rigidity of the air tube sidewalls.

35. The low-section tire of claim 34, wherein a thickness of the central core is greater than a thickness of the air tube sidewalls.

36. The low-section tire of claim 35, wherein the central core and the air tube sidewalls comprise a same elastomer material.

37. The low-section tyro of claim 34, wherein a modulus of an elastomer material of the central core is greater than a modulus of an elastomer material of the air tube sidewalls.

38. The low-section tire of claim 37, wherein a value of the modulus of the elastomer material of the central core is greater than or equal to 1.5 N/mm$^2$ and less than or equal to 10 N/mm$^2$.

39. The low-section tire of claim 37, wherein a ratio of the modulus of the elastomer material of the central core to the modulus of the elastomer material of the air tube sidewalls is greater than or equal to 1:1 and less than or equal to 10:1.

40. The low-section tire of claim 37, wherein the elastomer material of the central core comprises a first reinforcing filler, and wherein the elastomer material of the air tube sidewalls comprises a second reinforcing filler different from the first reinforcing filler.

41. The low-section tire of claim 37, wherein the elastomer material of the central core comprises first reinforcing fillers, and wherein the elastomer material of the air tube sidewalls comprises second reinforcing filler different from the first reinforcing fillers.

42. The low-section tire of claim 37, wherein the elastomer material of the central core comprises short fibers produced by grinding.

43. The low-section tire of claim 32, wherein the internal wall comprises at least one duct extending through the internal wall, and wherein the at least one duct is open on both extrados and intrados surfaces of the air tube.

44. The low-section tire of claim 43, wherein the at least one duct comprises a plurality of ducts circumferentially spaced apart from each other.

45. The low-section tire of claim 32, further comprising at least one valve for simultaneous inflation and deflation of the at least two distinct circumferential portions.

46. The low-section tire of claim 45, wherein the at least one valve comprises a cylindrical body for switching between two different positions, wherein a first position enables an air flow in opposite directions, wherein a second position stops air flow in both of the opposite directions, wherein the cylindrical body is connected to a protuberance incorporated in an elastomer material of a central core, wherein the cylindrical body is disposed in a radially-inner connecting area between the central core and a corresponding flange, wherein the protuberance comprises separate paths for air flow into the at least two distinct circumferential portions, wherein a nonreturn device stops air flow between the at least two distinct circumferential portions, and wherein the cylindrical body projects outwardly from the protuberance.

47. The low-section tire of claim 34, wherein the two flanges comprise a radially-inner flange and a radially-outer flange, wherein the radially-inner flange comprises two axial portions, and wherein one axial portion of the radially-inner flange comprises a bulge radially projecting toward the rotation axis of the air tube for fitting into a corresponding groove of the rim.

48. A tire wheel, comprising:

a rim; and a low-section tire mounted on the rim;

wherein the low-section tire comprises:

a carcass;

an air tube; and a belt structure disposed crownwise on the carcass;

wherein the carcass comprises a toroidal form, wherein the carcass flier comprises a crown portion and two axially-opposite carcass sidewalls delimiting an inner cavity, wherein the air tube comprises an elastomer material, wherein the air tube further comprises an internal wall and a pair of axially-opposite air tube sidewalls, wherein the internal wall separates the air tube into at least two distinct circumferential portions, wherein the internal wall extends in a plane substantially normal to a rotation axis of the air tube, wherein, when fully inflated, the air tube further comprises a right section in a meridian plane that is substantially elliptical, with a major axis parallel to the rotation axis of the air tube, and wherein a rigidity of the internal wall is greater than a rigidity of the air tube sidewalls so that, when the carcass and the air tube are mounted on the rim, and during inflation of the air tube, a radially-outer portion of the internal wall contacts a radially-inner surface of the crown portion simultaneously with a complete lying down of the air tube sidewalls against the carcass sidewalls.

49. The tire wheel of claim 48, wherein the tire comprises a first substantially-elliptical transverse section, wherein the air tube comprises a second substantially-elliptical transverse section, and wherein the tire comprises a ratio of section height to section width not greater than 0.7:1.

50. The tire wheel of claim 48, wherein junction areas of a radially-outer portion of a central core of the air tube to the air tube sidewalls are axially internal to ends of the belt structure.

51. The tire wheel of claim 50, wherein an axial distance between the junction areas is greater than or equal to 40% of a width of the belt structure and less than or equal to 80% of the width of the belt structure.

* * * * *